United States Patent
Wright et al.

(10) Patent No.: US 11,953,468 B2
(45) Date of Patent: Apr. 9, 2024

(54) APPARATUS, METHOD AND COMPUTER PROGRAM FOR DETECTING DEFECTS

(71) Applicant: Nokia Technologies Oy, Espoo (FI)

(72) Inventors: Christopher Wright, London (GB); Phil Catton, Cambridge (GB); Wai Lau, London (GB)

(73) Assignee: Nokia Technologies Oy, Espoo (FI)

( * ) Notice: Subject to any disclaimer, the term of this patent is extended or adjusted under 35 U.S.C. 154(b) by 218 days.

(21) Appl. No.: 17/349,341

(22) Filed: Jun. 16, 2021

(65) Prior Publication Data

US 2022/0003720 A1 Jan. 6, 2022

(30) Foreign Application Priority Data

Jul. 1, 2020 (EP) .................................... 20183444

(51) Int. Cl.
*G01N 29/12* (2006.01)
*G01N 29/04* (2006.01)
(Continued)

(52) U.S. Cl.
CPC ........... *G01N 29/12* (2013.01); *G01N 29/043* (2013.01); *G01N 29/0609* (2013.01); *G01N 29/069* (2013.01); *G06F 18/214* (2023.01)

(58) Field of Classification Search
CPC .. G01N 29/12; G01N 29/043; G01N 29/0609; G01N 29/069; G01N 29/04;
(Continued)

(56) References Cited

U.S. PATENT DOCUMENTS

2006/0144146 A1* 7/2006 Hedberg ................ G01N 29/12
73/579
2017/0074830 A1 3/2017 Bellotti et al.
(Continued)

FOREIGN PATENT DOCUMENTS

CN 205584305 U 9/2016
FI 128203 B 12/2019
(Continued)

OTHER PUBLICATIONS

"Samsung to Show off Sound-Producing Display Tech at CES 2019?", Android Authority, Retrieved on Jun. 14, 2021, Webpage available at : https://www.androidauthority.com/samsung-sound-on-display-ces-2019-937774/.
(Continued)

*Primary Examiner* — Xin Y Zhong
(74) *Attorney, Agent, or Firm* — Harrington & Smith (57) ABSTRACT

According to various, but not necessarily all, embodiments there is provided an apparatus comprising means for: controlling one or more electroacoustic transducers of a device to create a standing wave having a displacement antinode at an expected location of a component of the device; receiving a signal representing sound generated by vibration of the component driven by the standing wave; causing analysis of the signal to determine whether there is a defect based on whether the signal represents a sound that would be expected to result from vibration of the component driven by the standing wave in the absence of a defect.

20 Claims, 4 Drawing Sheets

(51) Int. Cl.
*G01N 29/06* (2006.01)
*G06F 18/214* (2023.01)

(58) Field of Classification Search
CPC .............. G01N 29/348; G01N 29/4427; G01N 29/4472; G06F 18/214; H04R 7/04; H04R 29/00; H04R 3/00
See application file for complete search history.

(56) References Cited

U.S. PATENT DOCUMENTS

| | | | |
|---|---|---|---|
| 2017/0195069 A1 | 7/2017 | Slavin | |
| 2017/0223196 A1 | 8/2017 | Udaka et al. | |
| 2022/0018895 A1* | 1/2022 | Sairiala | G01R 31/2825 |

FOREIGN PATENT DOCUMENTS

| | | | |
|---|---|---|---|
| WO | 2005/008236 A1 | 1/2005 | |
| WO | 2018/222658 A1 | 12/2018 | |
| WO | 2019/103767 A1 | 5/2019 | |

OTHER PUBLICATIONS

"LG G8 ThinQ to have OLED Screen as Speaker", ZDNet, Retrieved on Jun. 14, 2021, Webpage available at : https://www.zdnet.com/article/lg-g8-thinq-to-have-oled-screen-as-speaker/.

"Huawei's crazy New Phone ditches the Ear Speaker and Lets you Hear Calls through a Vibrating Screen", Business Insider, Retrieved on Jun. 14, 2021, Webpage available at : https://www.businessinsider.com/huawei-p30-pro-ditches-ear-speaker-vibrating-screen-2019-3?r=US&IR=T.

"Acoustic Resonance", Afensis, Retrieved on Jun. 14, 2021, Webpage available at : http://afensis.com.ar/en/tecnica-hdt/.

"Direct-field Acoustic Testing", Wikipedia, Retrieved on Jun. 14, 2021, Webpage available at : https://en.wikipedia.org/wiki/Direct-field_acoustic_testing.

"Natural Frequency", Wikipedia, Retrieved on Jun. 14, 2021, Webpage available at : https://en.wikipedia.org/wiki/Natural_frequency.

"Resonant Acoustic Method", The Modal Shop, Retrieved on Jun. 14, 2021, Webpage available at : http://www.modalshop.com/ndt/Resonant-Acoustic-Method?ID=73.

"Questions and Answers: A New Circular Economy Action Plan for a Cleaner and More Competitive Europe", European Comission, Retrieved on Jun. 14, 2021, Webpage available at : https://ec.europa.eu/commission/presscorner/detail/en/qanda_20_419.

"Google Agrees to Pay Owners of Faulty Pixel Phones up to $500", The Verge, Retrieved on Jun. 14, 2021, Webpage available at : https://www.theverge.com/2019/5/14/18623077/google-pixel-faulty-mic-issues-lawsuit-payout-hairline-fracture.

"Some Google Pixel 3a Owners Encountering Crooked USB-C, Speaker Cutouts", 9to5Google, Retrieved on Jun. 14, 2021, Webpage available at : https://9to5google.com/2019/05/20/pixel-3a-crooked-port/.

"Samsung Already Exchanged 500,000 Galaxy Note 7 units in the US", BGR, Retrieved on Jun. 14, 2021, Webpage available at : https://bgr.com/2016/09/23/galaxy-note-7-recall-us/.

"Testm Hardware", Google Play, Retrieved on Jun. 14, 2021, Webpage available at : https://play.google.com/store/apps/details?id=com.testm.app&hl=en_IN.

Yoon et al., "Appscope: Application Energy Metering Framework for Android Smartphones Using Kernel Activity Monitoring", Conference: Annual Conference on USENIX Annual Technical Conference, Jun. 2012, 14 pages.

Gul et al., "Smartphone controlled ultrasonic nondestructive testing system design", International Conference on Engineering Technologies (ICENTE'17), Dec. 2017, pp. 1-4.

Extended European Search Report received for corresponding European Patent Application No. 20183444.7, dated Dec. 23, 2020, 10 pages.

Sarens, Bart, et al., "Full-field imaging of nonclassical acoustic nonlinearity", Applied Physics Letters, vol. 91, No. 26, Dec. 27, 2007, 3 pages.

* cited by examiner

APPARATUS, METHOD AND COMPUTER PROGRAM FOR DETECTING DEFECTS

TECHNOLOGICAL FIELD

Embodiments of the present disclosure relate to an apparatus, method and computer program for detecting defects. Some relate to an apparatus, method and computer program for detecting defects with a device using electroacoustic transducers of the device.

BACKGROUND

It is known to perform software-based checks on hardware components of devices to determine if the hardware is defective. Checks of the physical condition of components are possible when the devices can be disassembled. For many devices, disassembly can be complex.

BRIEF SUMMARY

According to various, but not necessarily all, embodiments there is provided an apparatus comprising means for: controlling one or more electroacoustic transducers of a device to create a standing wave having a displacement antinode at an expected location of a component of the device; receiving a signal representing sound generated by vibration of the component driven by the standing wave; causing analysis of the signal to determine whether there is a defect based on whether the signal represents a sound that would be expected to result from vibration of the component driven by the standing wave in the absence of a defect.

In some examples there is provided for use of the apparatus to determine a condition of a battery of the device.

According to various, but not necessarily all, embodiments there is provided a method comprising: controlling one or more electroacoustic transducers of a device to create a standing wave having a displacement antinode at an expected location of a component of the device; receiving a signal representing sound generated by vibration of the component driven by the standing wave; causing analysis of the signal to determine whether there is a defect based on whether the signal represents a sound that would be expected to result from vibration of the component driven by the standing wave in the absence of a defect.

According to various, but not necessarily all, embodiments there is provided a computer program that, when run on a computer, performs: controlling one or more electroacoustic transducers of a device to create a standing wave having a displacement antinode at an expected location of a component of the device; receiving a signal representing sound generated by vibration of the component driven by the standing wave; causing analysis of the signal to determine whether there is a defect based on whether the signal represents a sound that would be expected to result from vibration of the component driven by the standing wave in the absence of a defect.

According to various, but not necessarily all, embodiments there is provided examples as claimed in the appended claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

The following portion of this "Brief Summary" section, describes various features that may be features of any of the embodiments described in the foregoing portion of the "Brief Summary" section. The description of a function should additionally be considered to also disclose any means suitable for performing that function.

The component may be an internal component of the device.

The one or more electroacoustic transducers may be controlled to cause a change in the position of the displacement antinode in response to a trigger event.

The one or more electroacoustic transducers may be controlled to cause a position of the displacement antinode to traverse at least one dimension of the device to enable scanning.

The one or more electroacoustic transducers may be controlled to cause a position of the displacement antinode to switch to an expected location of a different component to be tested for at least one defect.

At least one component having a defect may be identified based on analysis of signals representing sounds generated at different positions of the displacement antinode.

The one or more electroacoustic transducers may be controlled to vary a frequency of the standing wave while maintaining the position of the displacement antinode.

At least one defect may be identified based on analysis of signals representing sounds generated by vibrations of the component that are driven by different frequencies of the standing wave.

The one or more electroacoustic transducers may be controlled to cause a displacement node of the standing wave to be positioned at or proximate an expected location of another component of the device.

Determining whether the signal represents a sound that would be expected to result from vibration of the component driven by the standing wave in the absence of a defect may comprises: determining if there is a correlation between the signal and reference data representing a sound that would be expected to result from vibration of the component driven by the standing wave in the absence of a defect.

Determining whether the signal represents a sound that would be expected to result from vibration of the component driven by the standing wave in the absence of a defect may comprises: providing the signal to an anomaly detection model trained on a set of data representing sounds generated by vibration of the component.

A result of another diagnostic test in respect of the component may be received. If the result does not indicate that there is a defect, the expectation for a sound resulting from vibration of the component driven by the standing wave in the absence of a defect may be updated using the received signal.

At least one actuator of the one or more electroacoustic transducers may be controlled to generate vibration patterns, on a panel forming at least part of a display or casing of the device, which enable a displacement antinode to be formed at the expected location of the component.

A subset from a plurality of electroacoustic transducers may be selected wherein the selected subset controls vibration patterns, generated by a superposition of vibrations produced by the subset of electroacoustic transducers, which enable a displacement antinode to be formed at the expected location of the component.

BRIEF DESCRIPTION

Some examples will now be described with reference to the accompanying drawings in which.

DETAILED DESCRIPTION

Examples of the disclosure relate to an apparatus 101 that can be configured to determine a condition of the device 201 such as whether a defect is present. This is achieved by controlling one or more electroacoustic transducers 203 of the device 201 to perform a non-destructive evaluation of the internal integrity of the device 201. Thus, the apparatus 101 adapts the device 201 into a self-diagnosing device. Disassembly of the device 201 for diagnostics can be avoided or reduced.

A defect can be any abnormal physical property of the device 201 or its components, such as their geometry, density, homogeneity, and temperature. The presence of a defect will not necessarily lead to a failure of the device or component to perform its intended function.

Figure 1:
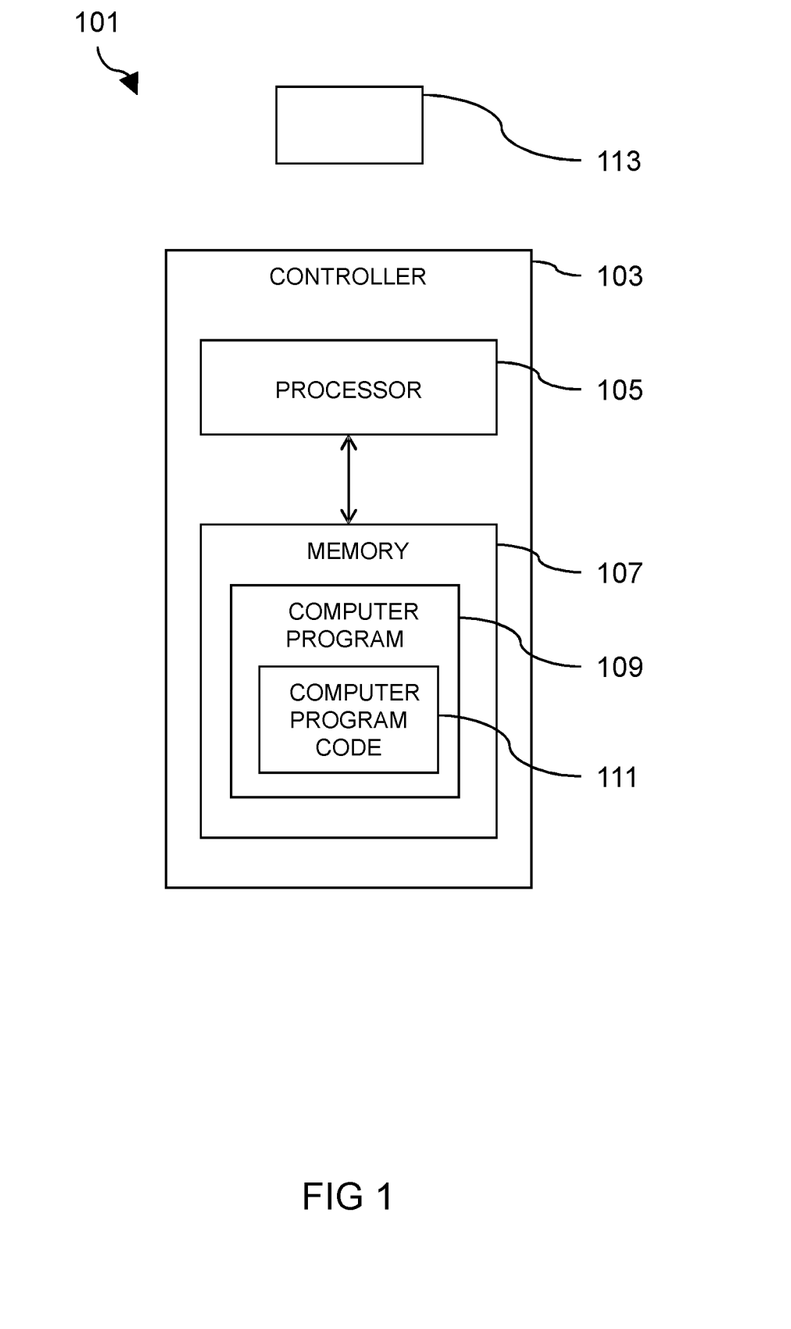
FIG. 1 shows an example apparatus.
Figure 2A:
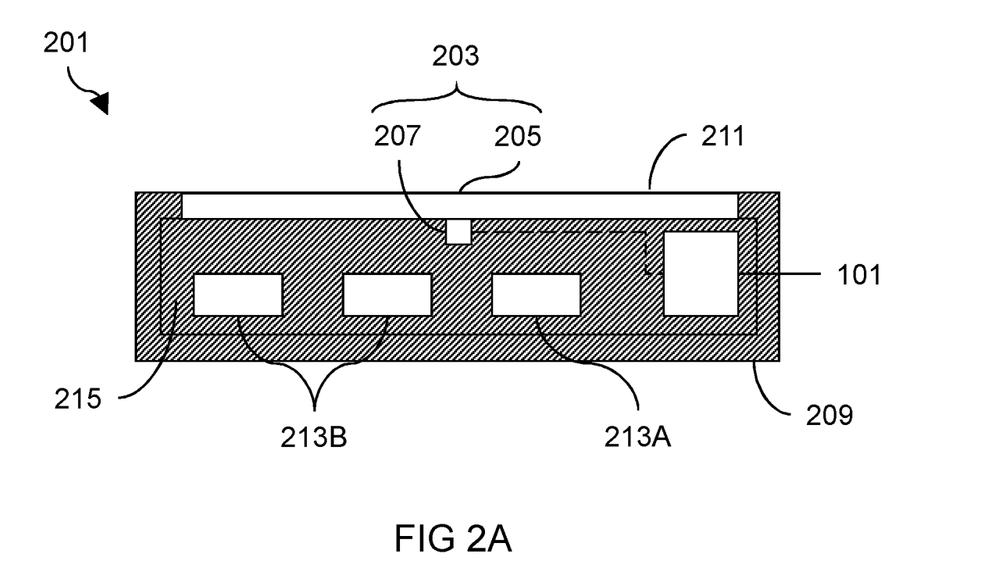
FIGS. 2A and B show examples of devices.
Figure 2B:
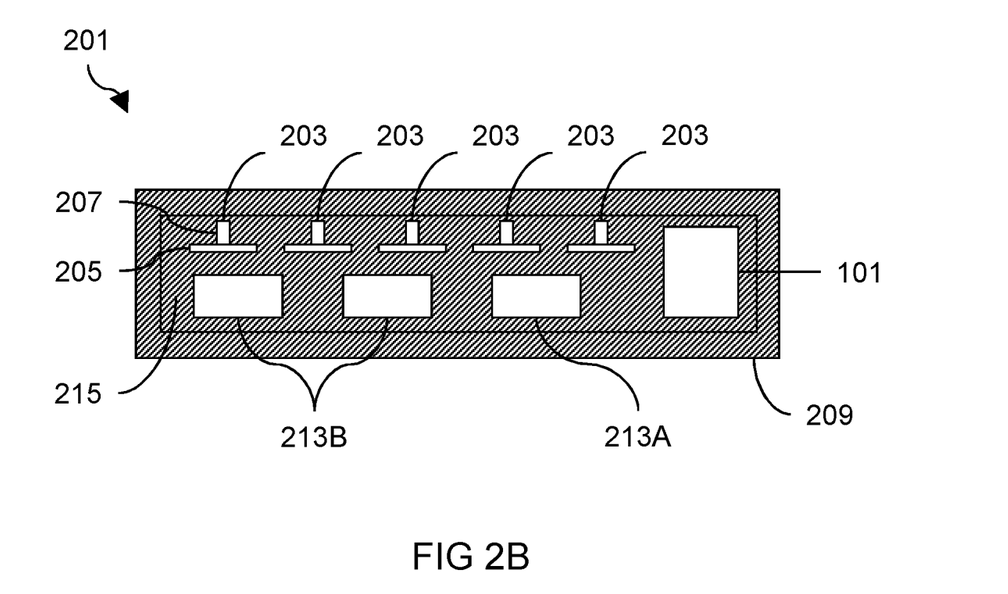

FIG. 1 schematically illustrates an apparatus 101 according to examples of the disclosure. The apparatus 101 illustrated in FIG. 1 may be a chip or a chip-set. In some examples the apparatus 101 may be provided within a device 201 such as schematically illustrated in FIG. 2.

In the example of FIG. 1 the apparatus 101 comprises a controller 103. Implementation of the controller 103 may be as controller circuitry. The controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory, etc.) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 stores a computer program 109 comprising computer program instructions (computer program code 111) that controls the operation of the apparatus 101 when loaded into the processor 105. The computer program instructions, of the computer program 109, provide the logic and routines that enables the apparatus to perform the methods illustrated in FIG. 3, and optionally the methods illustrated in FIG. 4. The processor 105 by reading the memory 107 is able to load and execute the computer program 109.

The apparatus 101 therefore comprises: at least one processor 105; and at least one memory 107 including computer program code 111, the at least one memory 107 and the computer program code configured to, with the at least one processor 105, cause the apparatus 101 at least to perform: controlling 303 one or more electroacoustic speakers 203 of a device 201 (as schematically illustrated in FIG. 2) to create a standing wave having an antinode at an expected location of a component 213A of the device 201; receiving 305 a signal representing sound generated by vibration of the component 213A driven by the standing wave; and causing analysis 307 of the signal to determine whether there is a defect based on whether the signal represents a sound that would be expected to result from vibration of the component 213A driven by the standing wave in the absence of a defect.

As illustrated in FIG. 1, the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IPv6 over low power personal area networks) ZigBee, ANT+, near field communication (NFC), Radio frequency identification, wireless local area network (wireless LAN) or any other suitable protocol.

Figure 3:
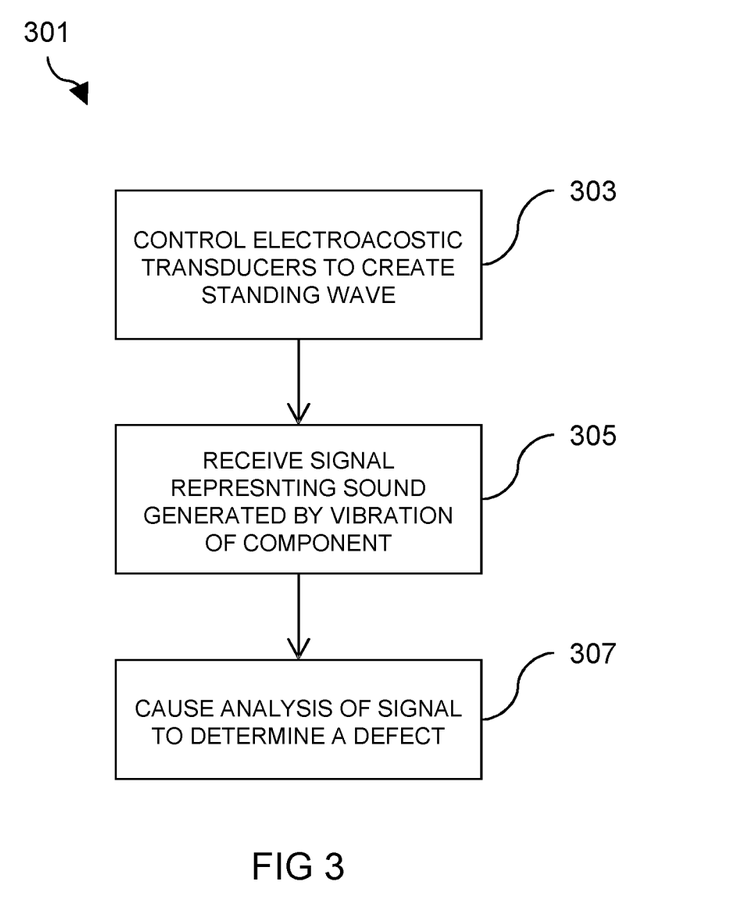
FIG. 3 shows an example method.

In some examples there is provided computer program instructions for causing an apparatus 101 to perform at least the following: controlling 303 one or more electroacoustic speakers 203 of a device 201 to create a standing wave having an antinode at an expected location of a component 213A of the device 201; receiving 305 a signal representing sound generated by vibration of the component 213A driven by the standing wave; and causing analysis 307 of the signal to determine whether there is a defect based on whether the signal represents a sound that would be expected to result from vibration of the component 213A driven by the standing wave in the absence of a defect.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 4:
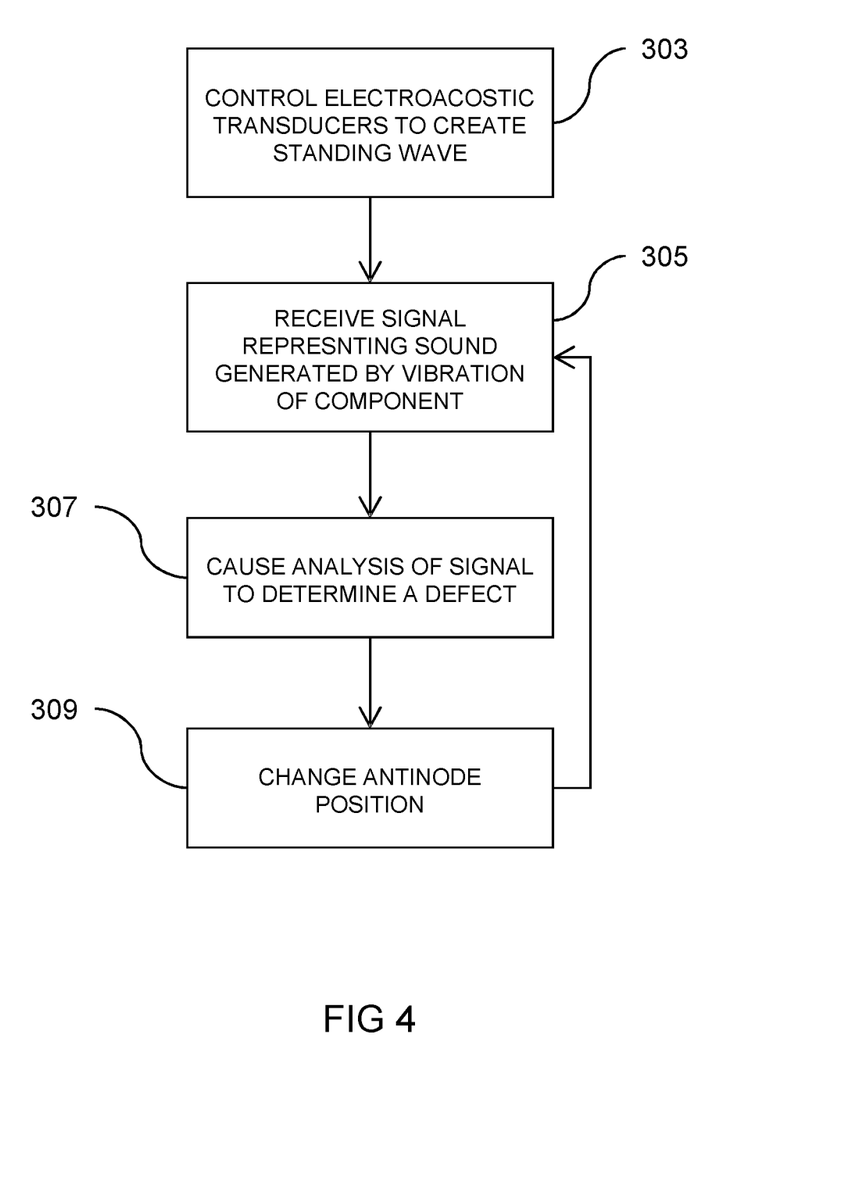
FIG. 4 shows an example method.

The blocks illustrated in FIG. 3 and, in some examples, those illustrated in FIG. 4 may represent steps in a method and/or sections of code in the computer program 109. The illustration of a particular order to the blocks does not necessarily imply that there is a required or preferred order for the blocks and the order and arrangement of the block may be varied. Furthermore, it may be possible for some blocks to be omitted.

FIGS. 2A and B schematically illustrates examples of a device 201 comprising the apparatus 101.

In some examples the device 201 is an electronic device. The device 201 may be an electronic communications device such as a personal computer. The electronic device may be a portable electronic communications device such as a handheld electronic communications device or a wearable electronic communications device. The device 201 may be configured for mobile cellular communication. The device 201 may be a smartphone, a smartwatch, or another type of portable personal computer. The device 201 may be a television.

In both examples the device 201 comprises one or more electroacoustic transducers 203. The one or more electroacoustic transducers 203 can be controlled as one or more speakers, converting an electrical signal into sound. In some examples the one or more electroacoustic transducers 203 can be controlled as one or more microphones, converting sound into an electrical signal. The device 201 may comprise a plurality of electroacoustic transducers 203. One or more of said plurality may be controlled as speakers while another one or more of said plurality may be controlled as microphones.

In the example of FIG. 2A the one or more electroacoustic transducers 203 comprise a panel 211 forming at least part of a display (not specifically shown) or casing 209 of the device 201 and at least one actuator 207 configured to apply force to the panel 211 to cause vibration of the panel 211. The panel 211 is configured as a diaphragm 205 for the one or more electroacoustic transducers 203. In some examples a plurality of actuators 207 are configured to apply force to the same panel 211. In some examples an actuator 207 configured to apply force to the panel 211 comprises multiple movable elements, each able to apply a different force to the panel 211.

In the example of FIG. 2B the one or more electroacoustic transducers 203 comprise a plurality of electroacoustic transducers 203, each having a diaphragm 205 and an actuator 207 configured to apply a force to the diaphragm 205. These electroacoustic transducers 203 can be distributed over a two-dimensional area. They may be distributed over a plane which is parallel to a panel forming part of a display or casing 209 of the device 201. They may be arranged in an array. They may be arranged into a regular pattern.

The device 201 comprises a plurality of components 213A, B other than the one or more electroacoustic transducers 203. In some examples these components 213A, B are internal components. The internal components 213A, B are components disposed within the device 201, for example within a cavity 215 defined by the casing 209 of the device 201 and can include a battery, a System-on-Chip, antenna, sensors such as gyroscopes or accelerometers, etc. In some examples the plurality of components 213A, B can comprise one or more exposed or external components such as buttons, camera lenses, panels of the casing 209, etc. The components 213 A, B are physical components.

FIG. 3 illustrates an example method 301 that can be implemented by an apparatus 101 as shown in FIG. 1 or by an apparatus 101 comprising any other suitable means.

The method 301 may be initiated periodically, for example every night or after power cycling. The method 301 may also be initiated on demand, for example when damage is suspected, when the device 201 is placed on charge, or prior to the device 201 being sold, exchanged, returned, or repaired.

The method 301 comprises, at block 303, controlling the one or more electroacoustic transducers 203 of the device 201 to create a standing wave having a displacement antinode at an expected location of a component 213A of the device 201.

The standing wave is a standing sound wave.

The standing wave created by the one or more electroacoustic transducers 203 in block 303 of the method 301 excites the component 213A so that it vibrates and thus produces a sound wave which can be detected.

The eigenfrequencies of the internal component 213A are sensitive to physical properties such as its geometry, density, homogeneity, and temperature. Thus, by exciting the component 213A, abnormalities in its physical conditions can be revealed in the resulting vibration and generated sound wave. Defects such as cracks, chips, dimensional errors, and bonding, welding, or soldering imperfections can therefore, with suitable analysis of the generated sound wave, be diagnosed.

Reference to sound or sound waves encompasses vibrations of any frequency and is not to be interpreted as limited to frequencies which are within audible limits of human hearing.

In some examples the standing wave can be formed within the device 201 due to interference between sound waves which are reflected at internal surfaces of the device 201. For example, sound waves generated by the one or more electroacoustic transducers 203 may be reflected back and forth between surfaces bounding a cavity 215 within the device 201. It is to be appreciated that the propagation of sound waves through the structure of the device 201 can enable displacement antinodes to be formed at the locations or expected locations of exposed or external components too.

It is to be understood that a component 213A targeted at block 303 of the method 301 and the one or more electroacoustic transducers 203 are different components of the device 201. The component 213A is not a part of the one or more electroacoustic transducers 203 such as an actuator 207 or diaphragm 205.

In some examples the component 213A is selected to be tested for at least one defect. The method 301 may comprise selecting, from a plurality of components 213A, B, the component 213A before controlling the one or more electroacoustic transducers 203 to create the standing wave having a displacement antinode at the expected location of the component 213A.

The selection of the component 213A can be based on a record of components which are considered at risk of developing defects. The selection can be based on monitoring of the performance of the device 201 or of specific components where the monitoring identifies components suspected of developing defects, for example from failure to perform functions associated with these components. The selection can be based on a request by a manufacturer of the device 201 to test a specific component that, for example, may have developed at least one defect in other devices of the same model.

Multiple components 213A, B may be selected and the method 301 can be performed for these multiple components 213A, B in turn.

The expected location of the component 213A is the location relative to the one or more electroacoustic transducers 203 where the component 213A is expected to be in the absence of a defect or in the absence of a new defect. The expected location may be the location where the component 213A is known to have been previously located. The expected location can be updated if the component 213A is found to be located differently to expected, for example as a result of developing a new defect.

In some examples, to create the standing wave in a device 201 such as illustrated in FIG. 2A, the at least one actuator 207 of the one or more electroacoustic transducers 203 can be controlled to generate vibration patterns, on the panel 211 forming at least part of the display or casing 209 of the device 201, which enable a displacement antinode to be formed at the expected location of the component 213A.

In some examples, to create the standing wave in a device 201 such as illustrated in FIG. 2B, a subset from the plurality of electroacoustic transducers 203 can be selected. The subset can be a set of one. The selected subset can control vibration patterns, generated by a superposition of vibrations produced by the electroacoustic transducers 203, which enable a displacement antinode to be formed at the expected location of the component 213A. Alternatively or in addition, different ones of the plurality of electroacoustic transducers 203 can be controlled differently.

To determine how to control the one or more electroacoustic transducers 203 to create the standing wave, finite element analysis of a model of the device 201 may be performed.

A model of the device 201 is a model of the structure and physical parameters of the device 201 which affect the propagation of sound waves. The model therefore considers parameters such as locations of individual components, geometries, material properties, and also attachment points between components.

Finite element analysis can be performed with the model using, for example, a single-input, multiple-output approach. For example, within the model, an element corresponding to the component 213A is excited as if by co-location with a displacement antinode of a standing sound wave and the response arising from the distribution of energy in the model is measured at elements corresponding to the one or more actuators 207 of the one or more electroacoustic transducers 203.

To implement block 303 of the method 301, the one or more actuators 207 of the one or more electroacoustic transducers 203 can be controlled to provide a time-reversed playback of the response obtained by finite element analysis. Due to acoustic reciprocity, when the actuators 207 are controlled according to a time-reversed playback, a standing wave having a displacement antinode at the location of the component 213A will be formed.

The finite element analysis can be performed in respect of different components 213A, B of the device 201 so that it is known how to control the one or more electroacoustic transducers 203 in order to create standing waves having displacement antinodes at locations of the different components 213A, B.

The finite element analysis can be performed with excitations of different frequencies.

Performing the finite element analysis with excitations of different frequencies can enable a determination of which frequency yields the highest amplitude of responses at the elements corresponding to the one or more actuators 207. The one or more electroacoustic transducers 203 can be controlled to create a standing wave with this frequency since controlling the actuators 207 to vibrate with higher amplitudes improves the signal-to-noise ratio.

Performing the finite element analysis with excitations of different frequencies can also or alternatively be used to determine how to control the one or more electroacoustic transducers 203 to vary a frequency of the standing wave while maintaining the position of the displacement antinode. In some examples the method 301 may comprise controlling the one or more electroacoustic transducers 203 to vary a frequency of the standing wave while maintaining the position of the displacement antinode. Different excitation frequencies of the component 213A can be sensitive to different properties, thus analysis of signals representing sounds generated by vibrations of the component 213A that are driven by different frequencies of the standing wave can enable identification of defects that are determined to be present.

In some examples the one or more electroacoustic transducers 203 of the device 201 are controlled to also cause a displacement node of the standing wave to be positioned at or proximate an expected location of at least one other component 213B of the device 201. This other component 213B may be one which is not being tested for defects at all or at a given time. As a result, while exciting the component 213A, the standing wave does not excite at least one other component 213B. This can assist in determining the source of any defect which is determined to be present. For example, if the presence of a defect can be determined while a first component is excited and a second component is not but is not determined while the second component is excited and the first component is not, it can be determined that the source of the defect is at least not the second component.

Finite element analysis can be performed with the model using a multiple-input, multiple-output approach to determine how to control the one or more electroacoustic transducers 203 to produce a standing wave having a displacement antinode at the expected location of one component 213A and a displacement node or nodes at expected locations of at least one other component 213B. The inputs for this finite element analysis include excitation of the element corresponding to the component 213A and zero or comparatively weak excitation of elements corresponding to the other components 213B. The response arising from the distribution of energy in the model is measured at the elements corresponding to the actuators 207 of the one or more electroacoustic transducers 203.

Thus, in order to produce a standing wave having a displacement antinode at the expected location of one component 213A and a displacement node or nodes at expected locations of at least one other component 213B, the actuators 207 of the one or more electroacoustic transducers 203 can be controlled according to a time-reversed playback of the response measured at each corresponding element in the model in order to produce the targeted standing wave.

In examples where the device 201 is transformable between different geometrical configurations, such as where the device 201 is a sliding or flip phone, the finite element analysis may have been performed for only one configuration or may have revealed that one configuration provides better acoustic conditions for implementation of the method 301 than the others. In such cases, a user may be prompted by provision of a perceivable output of the device 201 to transform the device 201 into that configuration before block 303 of the method 301 is implemented.

In some examples, the relative placement of components 213A, B within the device 201 may be informed by the results of testing the model so that the present method 301 can be performed with improved efficiency.

At block 305 the method 301 comprises receiving a signal representing sound generated by vibration of the component 213A as driven by the standing wave.

The signal can be received from any means suitable for converting the sound generated by vibration of the component 213A into an electrical signal. The signal can be received from at least one electroacoustic transducer of the device 201.

In some examples the signal can be received from at least one of the one or more electroacoustic transducers 203 which are controlled to create the standing wave. There will be a time differential between the control signal for creating the standing wave and the response in the form of sound generated by vibration of the component 213A. Therefore, the signal representing sound generated by vibration of the component 213A as driven by the standing wave may be captured by time gating the signal.

In other examples the signal can be received from at least one electroacoustic transducer separate from those one or more electroacoustic transducers 203 which are controlled to create the standing wave. The signal can be received from a dedicated microphone of the device 201.

At block 307 the method 301 comprises causing analysis of the signal. The analysis of the signal can determine whether there is a defect based on whether the signal represents a sound that would be expected to result from vibration of the component 213A driven by the standing wave in the absence of a defect.

The analysis may determine whether the component 213A has a defect or may determine the presence of a defect with the device 201 without identifying which component is defective.

In some examples this comprises determining if there is a correlation between the signal and reference data. The reference data represents a sound that would be expected to result from vibration of the component 213A driven by the standing wave in the absence of a defect.

The reference data can be stored locally at the device 201, for example in memory 107, or can be stored remotely and retrieved from a remote device. The reference data can be stored in the Cloud.

The reference data may be provided by the manufacturers of the device 201.

The reference data may originate from other devices of the same model. For example, the reference data may comprise a signal representing sound generated by vibration of the corresponding component of another device, which signal is transmitted to a remote device from which it can be retrieved by the present device 201.

The reference data can be obtained from a signal representing sound generated by vibration of the component 213A of the present device 201 in the absence of suspected defects or where no defects are found by other diagnostic tests.

The reference data can be obtained from finite element analysis performed with the model of the device's structure and physical parameters. For example, by exciting an element of the model corresponding to the component 213A as if it were excited by co-location of a displacement antinode, the response can be measured at the location of an element corresponding to the at least one electroacoustic transducer for converting sounds into signals to be analysed. The reference data can be based on this measured response. Furthermore, by speculatively modelling at least one defect to the components 213A, B within the model, reference data corresponding to specific defects can be obtained, allowing not only detection of the presence of a defect by comparison with reference data, but also identification of the present defect.

Correlation between the signal received in block 305 of the method 301 and reference data can be determined using pattern recognition, a similarity measure, or any other suitable process. The extent of the deviation from a correlation can indicate the severity of the defect.

If the analysis determines a good match or correlation between the signal received in block 305 of the method 301 and reference data then no further action is needed. In some examples data can be communicated to a manufacturer of the device 201 that indicates that no defect has been detected.

If the analysis does not determine a good match or correlation between the signal received in block 305 of the method 301 and reference data then this indicates the presence of at least one defect or the presence at least one possible defect subject to further investigation, such as with other diagnostic tests. In some examples an alert can be provided to a user of the device 201 that at least one defect has been detected. In some examples data can be communicated to a manufacturer of the device 201 that indicates that at least one defect has been detected.

In other examples the signal is provided, as an input, to an anomaly detection model. The anomaly detection model can be trained by machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The anomaly detection model is trained on a set of data representing sounds generated by vibration of the component 213A. In some examples the anomaly detection model can be dynamically updated, learning over time based on new signals representing sounds generated by vibration of the component 213A.

The training may involve supervised learning, such as classification, where the set of data used to train the model comprises data representing sounds which are labelled as having been generated by vibration of the component 213A in the presence of a defect and data representing sounds which are labelled as having been generated by vibration of the component 213A in the absence of a defect. In some examples the data may be labelled with the identity of the defects present, enabling the trained anomaly detection model to not only detect defects but also to identify the defects.

The training may also involve unsupervised learning, such as clustering, based on a set of data where it is assumed that the majority represent sounds generated by vibration of the component 213A in the absence of defects.

The anomaly detection model may be trained by any other suitable means.

No further action may be needed if the anomaly detection model does not output an indication that there is a defect. If the output indicates the presence of at least one defect or possible defect, further investigation, such as with other diagnostic tests, may be performed for confirmation and/or an alert may be provided to a user of the device 201 that at least one defect has been detected. In some examples data can be communicated to a manufacturer of the device 201 that indicates whether or not at least one defect has been detected.

In some examples, in addition to the analysis at block 307, a result of another diagnostic test in respect of the component 213A can be received. Although there may be an abnormal physical condition, if the component 213A is still able to perform its intended function, the result of another diagnostic test may not classify this as a defect. If the result does not indicate that there is a defect, the expectation for a sound resulting from vibration of the component 213A driven by the standing wave in the absence of a defect can be updated. This update can account for the signal received at block 305. This update can be enabled by storing the signal as new reference data or by labelling it as having been generated by vibration of the component 213A in the absence of a defect and including it in the set of data for training the anomaly detection model.

In some examples, a plurality of signals are obtained, representing sounds generated by vibrations of the component 213A that are driven by different frequencies of the standing wave. At least one defect can be identified based on analysis of these plurality of signals.

In some examples the analysis of the signal may not only detect whether the component 213A has a defect but can, for some components, determine their general condition. For example, physical properties of a battery, including its density and elastic moduli, are correlated with the current charge state of the battery. Thus, a battery's eigenfrequencies changes with charge state. Analysis of the signal representing sounds generated by vibration of a battery excited by the standing wave can therefore provide an indication of the charge state of the battery. In respect of batteries, their health, as reflected by dendrite formation, can also be indicated by analysis of this signal as dendrite formation will result in measurable acoustic variation. Thus, the apparatus 101 and method 301 can be used to determine a condition of a battery of the device 201.

Likewise, temperature can affect the eigenfrequencies of components 213A, B so analysis of signals representing sounds generated by vibration of the components 213A, B can provide an indication of the temperature of these components and thus an indication of the temperature distribution throughout the device 201.

Causing analysis of the signal can comprise causing local processing of the signal, for example by the processor 105, or can comprise communicating the signal to one or more remote devices where it can be processed remotely. The analysis can therefore be performed locally or remotely. Where an output of the analysis, such as an alert to the user, is produced, this can be communicated to the apparatus 101 which can cause the device 201 to provide the output in a form perceivable to the user.

Following performance of the method 301 to excite and analyse the excitement of one component 213A, the method 301 can be repeated in respect of other components 213B or other locations.

FIG. 4 illustrates an example in which, at block 309, the one or more electroacoustic transducers 203 are controlled to cause a change in the position of the displacement antinode in response to a trigger event such as, for example, a user input to the device 201 or a predefined routine, or a request from one or more applications run on the device 201. The one or more electroacoustic transducers 203 are controlled to create a standing wave having a displacement antinode in a different location in response to a trigger event. In some examples the one or more electroacoustic transducers 203 are controlled to create a standing wave having a displacement antinode in a different location, inside the device, in response to a trigger event.

In some examples the one or more electroacoustic transducers 203 are controlled to cause a position of the displacement antinode to switch to an expected location of a different component 213B. The method 301 can repeated to test, in turn, different components 213A, B for at least one defect. The method 301 can be performed on demand to test different components 213A, B for at least one defect. A determination of which different component 213B to test next can be based on a predetermined order, a user input to the device 201, the analysis of the preceding signal, and/or other suitable triggers which indicate which components are suspected of having developed a defect.

In other examples the one or more electroacoustic transducers 203 are controlled to cause a position of the displacement antinode to traverse at least one dimension of the device 201 to enable scanning. The scanning comprises causing recording of sounds resulting from different positions of the displacement antinode during the traverse.

In some examples the traverse may be performed in a constrained region around the component 213A. For example, if a defect in the soldering of the component 213A is determined by the analysis, the one or more electroacoustic transducers 203 can be controlled to move the displacement antinode through a region proximate to the component 213A to diagnose whether other soldering in this region is defective.

In some examples a full scan of the device 201 can be performed to provide an indication of the presence of any unsuspected defects.

While in some examples the analysis of the signal representing sound generated by vibration of the component 213A as driven by the standing wave may determine that the component 213A has at least one defect, in other examples, the analysis may only determine the presence of at least one defect with the device 201 as a whole. In such cases, by repeating the method 301 in respect of other components 213B or other locations enables consideration of multiple sound propagation paths within the device 201 and thus can be used to identify the component or components having at least one defect. Thus, identification of at least one component having a defect can be based on analysis of signals representing sounds generated at different positions of the displacement antinode.

In some examples, where analysis of signals representing sounds generated at different positions of the displacement antinode consistently determines that these do not represent expected sounds, an indication of factors affecting the creation of the standing waves can be provided. For example, the analysis can determine that there is a defect with the one or more electroacoustic transducers 203 which are controlled to create the standing waves, or can determine that there is a defect with the structure of the device 201 which defines the cavity in which standing waves can be formed, such as potentially damaging grit stuck to the casing 209 of the device 201 or to other exposed or external components, or can determine that the at least one electroacoustic transducer for converting the sounds into the signals to be analysed has a defect. The user may be provided guidance to visually inspect, and if appropriate to clean, the device 201 before repeating the method 201.

In examples where the analysis is communicated to the manufacturer and multiple devices of the same model consistently determine that signals representing sounds generated at different positions of the displacement antinode do not represent expected sounds, the manufacturer can investigate to understand the systemic issues and, where appropriate issue updates to, for example, the reference data or the anomaly detection model.

The above described apparatus 101, method 301, and computer program 109 can be used to determine, for example: manufacturing defects such as dry joints or geometrical flaws; the state of charge of a battery; the condition of a battery such as the level of degradation to anodes and cathodes; the presence of external debris which may cause damage if not removed from the device 201 such as grit which could become trapped in the hinge of a folding phone; temperature distribution throughout the device 201; and information about attachments such as screen protectors or cases which affects the structure of the device 201 and thus the standing waves which are created.

In some examples separate devices may be employed to either help create the standing waves having displacement antinodes at the expected location of a component 213A of the device 201 or record the sound generated by vibration of the component 213A. Such separate devices could include mobile phones or charging docks with inbuilt speakers or fans.

Where a structural feature has been described, it may be replaced by means for performing one or more of the functions of the structural feature whether that function or those functions are explicitly or implicitly described.

Consequently, in some examples, the apparatus 101 comprises means for: controlling one or more electroacoustic transducers 203 of a device 201 to create a standing wave having a displacement antinode at an expected location of a component 213A of the device 201; receiving a signal representing sound generated by vibration of the component 213A driven by the standing wave; and causing analysis of the signal to determine whether there is a defect based on whether the signal represents a sound that would be expected to result from vibration of the component 213A driven by the standing wave in the absence of a defect.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one" or by using "consisting".

In this description, reference has been made to various examples. The description of features or functions in relation to an example indicates that those features or functions are present in that example. The use of the term "example" or "for example" or "can" or "may" in the text denotes, whether explicitly stated or not, that such features or functions are present in at least the described example, whether described as an example or not, and that they can be, but are not necessarily, present in some of or all other examples. Thus "example", "for example", "can" or "may" refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term "a" or "the" is used in this document with an inclusive not an exclusive meaning. That is any reference to X comprising a/the Y indicates that X may comprise only one Y or may comprise more than one Y unless the context clearly indicates the contrary. If it is intended to use "a" or "the" with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavouring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
   at least one processor; and
   at least one non-transitory memory storing instructions that, when executed with the at least one processor, cause the apparatus to:
   determine control parameters of one or more electroacoustic transducers using a finite element analysis of a model of a device;
   control the one or more electroacoustic transducers of the device to create a standing wave based on the finite element analysis of the model of the device, the standing wave having a displacement antinode at an expected location of a component of the device;
   receive a signal representing sound generated with vibration of the component driven with the standing wave; and
   cause analysis of the signal to determine whether there is a defect based on whether the signal represents a sound that is the same as a result from vibration of the component driven with the standing wave in an absence of a defect.

2. The apparatus of claim 1 wherein the instructions, when executed with the at least one processor, cause the apparatus to:
   control the one or more electroacoustic transducers to cause a change in the position of the displacement antinode in response to a trigger event.

3. The apparatus of claim 1 wherein the instructions, when executed with the at least one processor, cause the apparatus to:
   control the one or more electroacoustic transducers to cause a position of the displacement antinode to traverse at least one dimension of the device to enable scanning.

4. The apparatus of claim 1 wherein the instructions, when executed with the at least one processor, cause the apparatus to:
   control the one or more electroacoustic transducers to cause a position of the displacement antinode to switch to an expected location of a different component to be tested for at least one defect.

5. The apparatus of claim 2 wherein the instructions, when executed with the at least one processor, cause the apparatus to:
   identify at least one component having a defect based on analysis of signals representing sounds generated at different positions of the displacement antinode.

6. The apparatus of claim 1 wherein the instructions, when executed with the at least one processor, cause the apparatus to:
   control the one or more electroacoustic transducers to vary a frequency of the standing wave while maintaining the position of the displacement antinode.

7. The apparatus of claim 6 wherein the instructions, when executed with the at least one processor, cause the apparatus to:
   identify at least one defect based on analysis of signals representing sounds generated with vibrations of the component that are driven with different frequencies of the standing wave.

8. The apparatus of claim 1 wherein the instructions, when executed with the at least one processor, cause the apparatus to:
   control the one or more electroacoustic transducers to cause a displacement node of the standing wave to be positioned at or proximate an expected location of another component of the device.

9. The apparatus of claim 1 wherein the instructions, when executed with the at least one processor, cause the apparatus to perform:
   determining if there is a correlation between the signal and reference data representing a sound that would be expected to result from vibration of the component driven with the standing wave in the absence of a defect.

10. The apparatus of claim 1 wherein the instructions, when executed with the at least one processor, cause the apparatus to perform:
    providing the signal to an anomaly detection model trained on a set of data representing sounds generated with vibration of the component.

11. The apparatus of claim 1 wherein the instructions, when executed with the at least one processor, cause the apparatus to:
    receive a result of another diagnostic test in respect of the component; and
    if the result does not indicate that there is a defect, update the expectation for a sound resulting from vibration of the component driven with the standing wave in the absence of a defect using the received signal.

12. The apparatus of claim 1 wherein the instructions, when executed with the at least one processor, cause the apparatus to:
    control at least one actuator of the one or more electroacoustic transducers to generate vibration patterns, on a panel forming at least part of a display or casing of the device, which enable a displacement antinode to be formed at the expected location of the component.

13. The apparatus of claim 1 wherein the instructions, when executed with the at least one processor, cause the apparatus to:
    select a subset from a plurality of electroacoustic transducers wherein the selected subset controls vibration patterns, generated with a superposition of vibrations produced with the subset of electroacoustic transducers, which enable a displacement antinode to be formed at the expected location of the component.

14. The apparatus of claim 1, wherein the instructions, when executed with the at least one processor, cause the apparatus to:
determine a condition of a battery of the device.

15. A method, comprising:
determining control parameters of one or more electroacoustic transducers using a finite element analysis of a model of a device;
controlling the one or more electroacoustic transducers of the device to create a standing wave based on the finite element analysis of the model of the device, the standing wave having a displacement antinode at an expected location of a component of the device;
receiving a signal representing sound generated with vibration of the component driven with the standing wave; and
causing analysis of the signal to determine whether there is a defect based on whether the signal represents a sound that is the same as a result from vibration of the component driven with the standing wave in an absence of a defect.

16. The method of claim 15, further comprising:
controlling the one or more electroacoustic transducers to cause a change in the position of the displacement antinode in response to a trigger event.

17. The method of claim 15, further comprising:
controlling the one or more electroacoustic transducers to cause a position of the displacement antinode to traverse at least one dimension of the device to enable scanning.

18. A non-transitory program storage device readable with an apparatus, tangibly embodying a program of instructions for performing at least the following:
determining control parameters of one or more electroacoustic transducers using a finite element analysis of a model of a device;
controlling the one or more electroacoustic transducers of the device to create a standing wave based on the finite element analysis of the model of the device, the standing wave having a displacement antinode at an expected location of a component of the device;
receiving a signal representing sound generated by vibration of the component driven with the standing wave; and
causing analysis of the signal to determine whether there is a defect based on whether the signal represents a sound that is the same as a result from vibration of the component driven with the standing wave in an absence of a defect.

19. The non-transitory program storage device of claim 18 further comprising the program of instructions stored thereon for performing at least the following:
controlling the one or more electroacoustic transducers to cause a change in the position of the displacement antinode in response to a trigger event.

20. The non-transitory program storage device of claim 18 further comprising the program of instructions stored thereon for performing at least the following:
controlling the one or more electroacoustic transducers to cause a position of the displacement antinode to traverse at least one dimension of the device to enable scanning.

* * * * *